US012626287B2

(12) United States Patent
Tan et al.

(10) Patent No.: US 12,626,287 B2
(45) Date of Patent: May 12, 2026

(54) PROCESSING CROWD-SOURCED INFORMATION USING MACHINE LEARNING BASED LANGUAGE MODELS

(71) Applicant: Maplebear Inc., San Francisco, CA (US)

(72) Inventors: Li Tan, Fremont, CA (US); Haixun Wang, Bellevue, WA (US); Shishir Kumar Prasad, Fremont, CA (US); Tejaswi Tenneti, San Carlos, CA (US); Aomin Wu, Scarsdale, NY (US); Jagannath Putrevu, Danville, CA (US)

(73) Assignee: Maplebear Inc., San Francisco, CA (US)

( * ) Notice: Subject to any disclaimer, the term of this patent is extended or adjusted under 35 U.S.C. 154(b) by 131 days.

(21) Appl. No.: 18/596,590

(22) Filed: Mar. 5, 2024

(65) Prior Publication Data

US 2024/0303710 A1 Sep. 12, 2024

Related U.S. Application Data

(60) Provisional application No. 63/462,722, filed on Apr. 28, 2023, provisional application No. 63/450,255, filed on Mar. 6, 2023.

(51) Int. Cl.
*G06Q 30/00* (2023.01)
*G06Q 30/0201* (2023.01)
(Continued)

(52) U.S. Cl.
CPC ..... *G06Q 30/0627* (2013.01); *G06Q 30/0201* (2013.01); *G06Q 30/0282* (2013.01)

(58) Field of Classification Search
CPC ........... G06Q 30/0627; G06Q 30/0629; G06Q 30/0201; G06Q 30/0211;
(Continued)

(56) References Cited

U.S. PATENT DOCUMENTS

| | | | | |
|---|---|---|---|---|
| 12,032,905 B2 * | 7/2024 | Blaya | .................... | G06F 40/284 |
| 2010/0274787 A1 * | 10/2010 | Lu | ......................... | G06Q 30/02 |
| | | | | 707/E17.089 |

(Continued)

OTHER PUBLICATIONS

Anderson: "Conversational Search Technology," pulse2.com, Jun. 5, 2020, 3pgs. (Year: 2020).*

*Primary Examiner* — Robert M Pond
(74) *Attorney, Agent, or Firm* — Fenwick & West LLP

(57) ABSTRACT

A system, for example, an online system uses a machine learning based language model, for example, a large language model (LLM) to process crowd-sourced information provided by users. The crowd-sourced information may include comments from users represented as unstructured text. The system further receives queries from users and answers the queries based on the crowd-sourced information collected by the system. The system generates a prompt for input to a machine-learned language model based on the query. The system provides the prompt to the machine-learned language model for execution and receives a response from the machine-learned language model. The response comprises the insight on the topic and evidence for the insight. The evidence identifies one or more comments used to obtain the insight.

20 Claims, 7 Drawing Sheets

(51) Int. Cl.
 *G06Q 30/0282* (2023.01)
 *G06Q 30/0601* (2023.01)
(58) Field of Classification Search
 CPC ..... G06Q 30/020112; G06Q 30/02012; G06Q
 30/020121; G06Q 30/020122; G06Q
 30/02013; G06Q 30/02014; G06Q
 30/020141; G06Q 30/02015; G06Q
 30/02016; G06Q 30/02017; G06Q
 30/02018; G06Q 30/0282
 USPC ...................................................... 705/26, 27
 See application file for complete search history.

(56) References Cited

U.S. PATENT DOCUMENTS

2021/0117617 A1 * 4/2021 Blaya ..................... G06N 20/00
2021/0342377 A1 * 11/2021 Galle ..................... G06F 40/58

\* cited by examiner

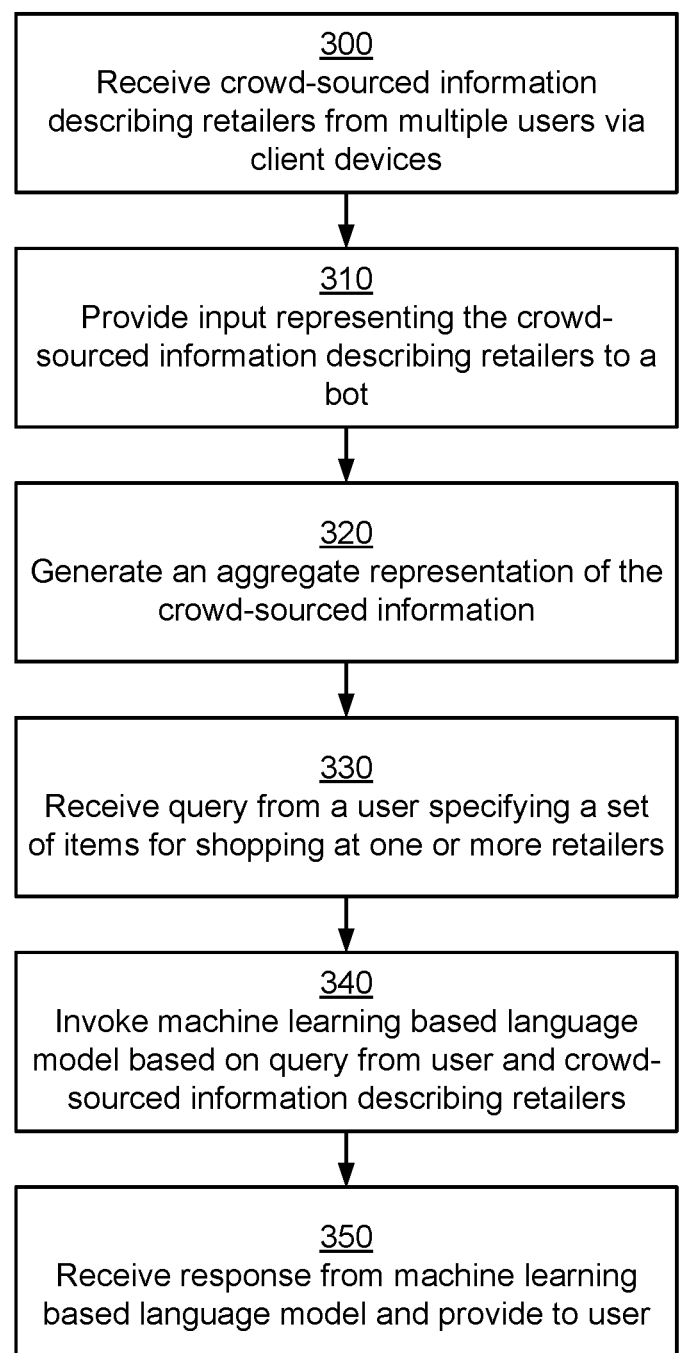

300
Receive crowd-sourced information describing retailers from multiple users via client devices

310
Provide input representing the crowd-sourced information describing retailers to a bot

320
Generate an aggregate representation of the crowd-sourced information

330
Receive query from a user specifying a set of items for shopping at one or more retailers

340
Invoke machine learning based language model based on query from user and crowd-sourced information describing retailers

350
Receive response from machine learning based language model and provide to user

FIG. 3

400
Receive crowd-sourced information from multiple users via client devices

410
Generate an aggregate representation of crowd-sourced information

420
Receive query from a user

430
Invoke machine learning based language model based on query and crowd-sourced information

440
Receive response from machine learning based language model and provide to user

PROCESSING CROWD-SOURCED INFORMATION USING MACHINE LEARNING BASED LANGUAGE MODELS

CROSS-REFERENCE TO RELATED APPLICATIONS

This application claims the benefit of U.S. Provisional Application No. 63/450,255, filed on Mar. 6, 2023, and of U.S. Provisional Application No. 63/462,722, filed on Apr. 28, 2023, each of which is incorporated by reference herein in its entirety.

TECHNICAL FIELD

One or more aspects described herein relate generally to analyzing unstructured text data using machine learning based language models, and more specifically to processing unstructured text such as crowd-sourced information using machine learning based language models.

BACKGROUND

Systems such as online systems often store large amounts of unstructured data. For example, a system may store a large corpus of documents comprising unstructured data. An online system may receive user feedback representing unstructured text. Often such unstructured data includes information that is useful to other users. Typical techniques for searching through such data include text search techniques. If the data comprises a large number of small documents, for example, documents representing user feedback, conventional text search techniques for processing the data can be inefficient. For example, several documents may match a search request, thereby requiring significant manual effort to process the search results.

SUMMARY

In accordance with one or more aspects of the disclosure, a system receives crowd-sourced information from multiple client devices. The system provides the crowd-sourced information to a machine learning based language model. The system uses the aggregate representations to answer queries from users based on the crowd-sourced information. The system receives a query and generates a prompt for the machine learning based language model based on the query. The system provides the prompt to the machine learning based language model for execution and receives a response generated by the machine learning based language model. The system provides the generated response to the user providing the query.

According to one or more embodiments, the system receives crowd-sourced information comprising one or more statements from multiple client devices. The system generates an aggregate representation of the crowd-sourced information. The system receives a query from a client device. The system generates a prompt for a machine learning based language model based on the query and the aggregate representation of the crowd-sourced information. The system provides the prompt to the machine learning based language model for execution. The system receives a response generated by executing the machine learning based language model on the prompt and provides the response to the user of the client device.

According to one or more embodiments, the crowd-sourced information represents comments received from users. The system receives requests from users and generates insights based on the comments. The system extracts insights from the corpus of comments received from users. The system also provides evidence for each insight, for example, specific comments used to gain a particular insight.

According to one or more embodiments, the system receives comments from users. The system provides the comments to an index associated with a machine learned language model. The index aggregates the information in the comments so that questions based on the comments can be answered in conjunction with the machine learned language model. The system receives a query requesting an insight on a particular topic. The system generates a prompt for the machine learning based language model based on the query. The system provides the prompt to the machine learning based language model for execution. The system receives a response generated by the machine learning based language model based on the prompt. The response comprises the insight on the particular topic and evidence for the insight. The evidence identifies one or more comments used to obtain the insight. The system provides the response to a user that requested the information.

BRIEF DESCRIPTION OF THE DRAWINGS

FIG. 3 is a flowchart for answering shopping related queries based on crowd-sourced information describing retailers collected from multiple users, in accordance with one or more embodiments.

Figure 1A:
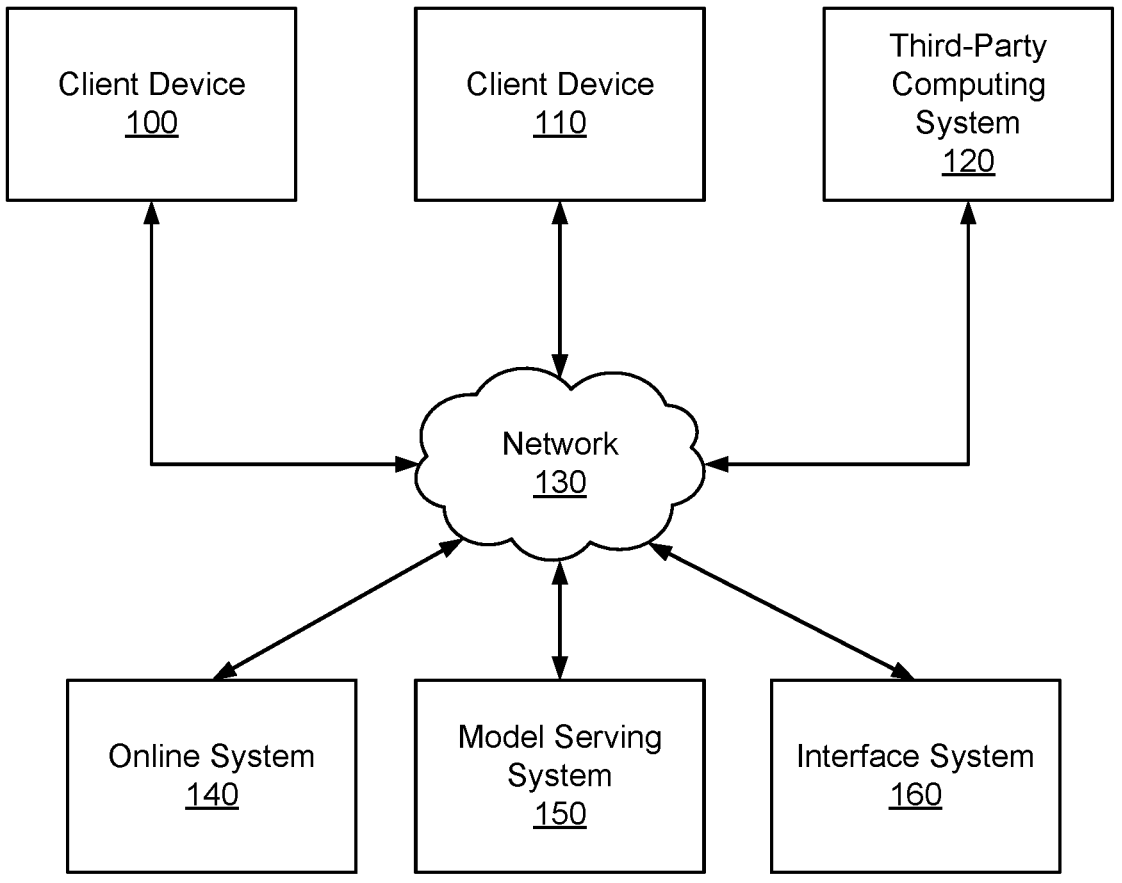
FIG. 1A illustrates an example system environment for an online system, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An online system uses a machine learning based language model, for example, a large language model (LLM) to extract knowledge from free text provided by users such as personal shoppers. The knowledge may include complaints about a particular physical store such as lack of parking, information about items that may not be available at specific stores, long waiting times, and so on. A bot receives the free text from the shoppers to collect the information provided by shoppers. According to one or more embodiments, the bot represents a lightweight language model. The system allows users to ask queries that are answered based on the collective information obtained from the shoppers. In response to a query received from a user, the system generates a prompt for the machine learning based language model that incorporates the query along with relevant portions of the collective information. The system receives a textual result from the machine learning based language model and may provide the result to the user.

Accordingly, the online system collects and assimilates crowd-sourced information for subsequent queries to make the crowd-sourced information available to subsequent users in their specific contexts. For example, if a user (e.g., a personal shopper) visits a particular store, the user may have information describing the stores such as specific items not available, long waiting times at checkout, difficulties in finding parking for that store, some equipment relevant to shopping is broken in the store (e.g., a machine used for making certain type of fresh product is broken), and so on. Since there can be multiple users going to different stores, there is a collective knowledge available with the users that describes the different stores.

The online system provides an interface that allows users to provide this information. According to one or more embodiments, the users can input this information in free text, for example natural language. For example, a user may input a natural language sentence such as "it was very difficult to find parking at store XYZ", or "checkout lines are very long at store PQR", and so on. Accordingly, users can provide this information in a conversational way to the online system.

The online system aggregates the information provided by various users using a machine learning based language model. The online system leverages the aggregate information to help new users that are looking for information related to these stores. For example, if a user is interested in shopping for a list of items at a particular store, the user can ask a natural language question to the online system looking for advice. The online system uses the machine learning based language model to generate a response that is specific to the store that the user is interested in and to the list of items that the user is interested in. For example, the online system may use the machine learning based language model to generate a natural language response that informs the user that the store may have long waiting times, some specific items from the user's list may not be available, and/or some equipment associated with one or more items on ten user's shopping list is broken. The user may be interested in shopping for a list of items at any given store. The online system uses the machine learning based language model to generate a natural language response to the user based on various issues in the stores that have the items available for the user and have minimum issues related to shopping for those items.

Although the technique disclosed herein refers to shopping as an example, the techniques can be used in other scenarios where crowd-sourced knowledge is useful for summarization, classification, and for answering queries.

FIG. 1A illustrates an example system environment for an online system 140, in accordance with one or more embodiments. The system environment illustrated in FIG. 1A includes client devices 100, 110, a third-party computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention. Additionally, any number of client devices may interact with the online system 140.

The client device 100 is a client device through which a user may interact with another client device 110, the third-party computing system 120, or the online system 140. The client device 100 can be a personal or mobile computing device, such as a smartphone, a tablet, a laptop computer, or desktop computer. In some embodiments, the client device 100 executes a client application that uses an application programming interface (API) to communicate with the online system 140.

A user uses the client device 100 to place an order with the online system 140. An order specifies a set of items to be delivered to the user. An "item", as used herein, means a good or product that can be provided to the user through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The client device 100 presents a user interface that allows the user to perform actions such as performing searches or placing an order with the online system 140. The ordering interface may be part of a client application operating on the client device 100. The ordering interface allows the user to search for items that are available through the online system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The client device 100 may receive additional content from the online system 140 to present to a user. For example, the client device 100 may receive coupons, recipes, or item suggestions. The client device 100 may present the received additional content to the user as the user uses the client device 100 to place an order (e.g., as part of the ordering interface).

Additionally, the client device 100 includes a communication interface that allows a user to communicate with other users. This communication interface allows the user to input a text-based message to transmit to the client device 110 via the network 130. The client device 110 receives the message from the client device 100 and presents the message to the user of the client device 110. The client device 110 also includes a communication interface that allows the user to communicate with other users. The client device 110 transmits a message provided by the user to the client device 100 via the network 130. In some embodiments, messages sent between the client device 100 and the client device 110 are transmitted through the online system 140. In addition to text messages, the communication interfaces of the client device 100 and the client device 110 may allow the users to communicate through audio or video communications, such as a phone call, a voice-over-IP call, or a video call.

The client device 110 is a client device through which a user may interact with other client devices 100, the third-party computing system 120, or the online system 140. The client device 110 can be a personal or mobile computing device, such as a smartphone, a tablet, a laptop computer, or desktop computer. In some embodiments, the client device 110 executes a client application that uses an application programming interface (API) to communicate with the online system 140.

The third-party computing system 120 is a computing system operated by a third-party, for example, a retailer that interacts with the online system 140. As used herein, a "retailer" is an entity that operates a "retailer location," which is a store, warehouse, or other building. The third-party computing system 120 stores and provides item data to the online system 140 and may regularly update the online system 140 with updated item data. For example, the third-party computing system 120 provides item data indicating which items are available at a location and the quantities of those items. Additionally, the third-party computing system 120 may transmit updated item data to the online system 140 when an item is no longer available at a location. Additionally, the third-party computing system 120 may provide the online system 140 with updated item prices, sales, or availabilities.

The client devices 100, 110, the third-party computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLMs, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the online system 140 collects crowd-sourced information from multiple users. The online system 140 receives and processes queries based on the crowd-sourced knowledge. Specifically, the online system 140 prepares a prompt for input to the model serving system 150 based on the user queries. The prompt incorporates the crowd-sourced knowledge obtained in the past from the users along with the new query from the user. The online system 140 receives a response to the prompt from the model serving system 150 based on execution of the machine-learned model using the prompt. The online system 140 obtains the response and provides the requested information to the user.

The online system 140 receives crowd-sourced information from users and provides it to the interface system 160. According to one or more embodiments, the interface system 160 includes a bot that represents a conversation engine that allows users to interact with the online system. Users can interact with the bot to provide information to the bot as well as to ask questions based on information provided by other users.

For an online shopping application, the online system 140 may receive information about various stores from personal shoppers that have visited those stores. Specifically, the online system 140 provides the crowd-sourced knowledge represented as statements received from the users to the interface system 160. The online system 140 provides a query received from a user to the interface system 160. The online system 140 receives a response to the prompt from the interface system 160 based on execution of the machine-learned model in the model serving system 150 using prompts generated by the interface system 160. The online system 140 obtains the response and provides the requested information to the user.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data to perform any task that the machine-learned model of the model serving system 150 could perform. For example, the task may be to perform question-answering, text summarization, text generation, and the like based on information contained in an external dataset.

In one embodiment, the online system 140 is connected to an interface system 160. The interface system 160 includes a bot that interacts with the user using natural language text to receive crowd-sourced information. The bot represents a module or a program that interacts with users to perform a conversation with the users to collect information, for example statements representing crowd-sourced information. The bot also provides an interface that allows users to ask questions (or queries) based on the crowd-sourced information.

According to one or more embodiments, the interface system 160 receives external data from the online system 140 (for example, crowd-sourced information) and builds a structured index over the external data using, for example, another machine learning based language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. For example, the prompt may include the query received from the user that may specify a list of items that the user is interested in shopping and optionally one or more stores from where the user is interested in shopping. The prompt may further include a representation of the crowd-sourced information. The prompt may further include a representation of a subset of the crowd-sourced information that is relevant to the user's query. The representation of the crowd-sourced information may be an aggregate representation that aggregates a set of statements received from one or more users that are relevant to the user's query.

Figure 1B:
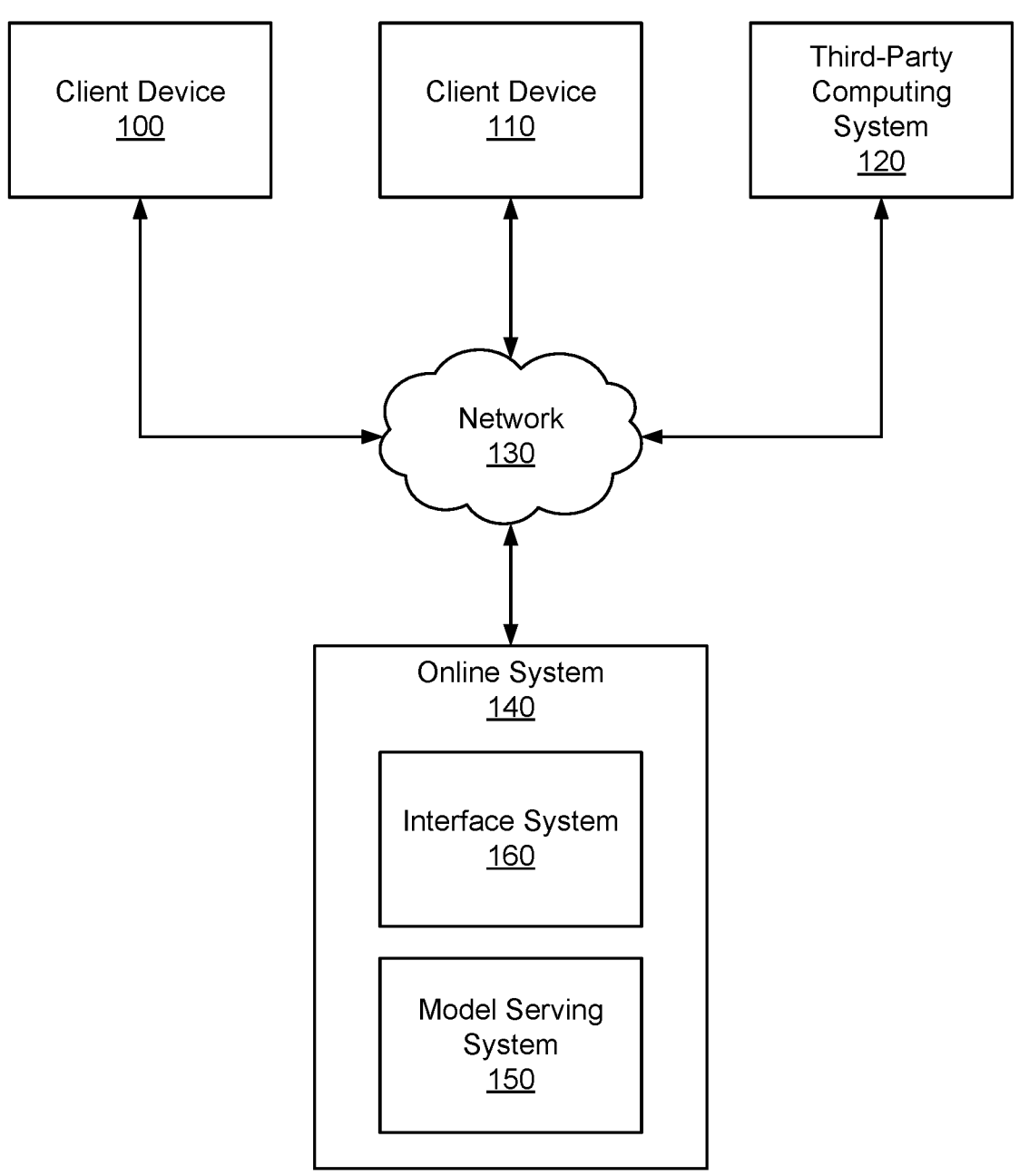
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes client devices 100, 110, a third-party computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one embodiment, as illustrated in the example system environment in FIG. 1B, the model serving system 150 and/or the interface system 160 is managed and deployed by the entity managing the online system 140.

Figure 2:
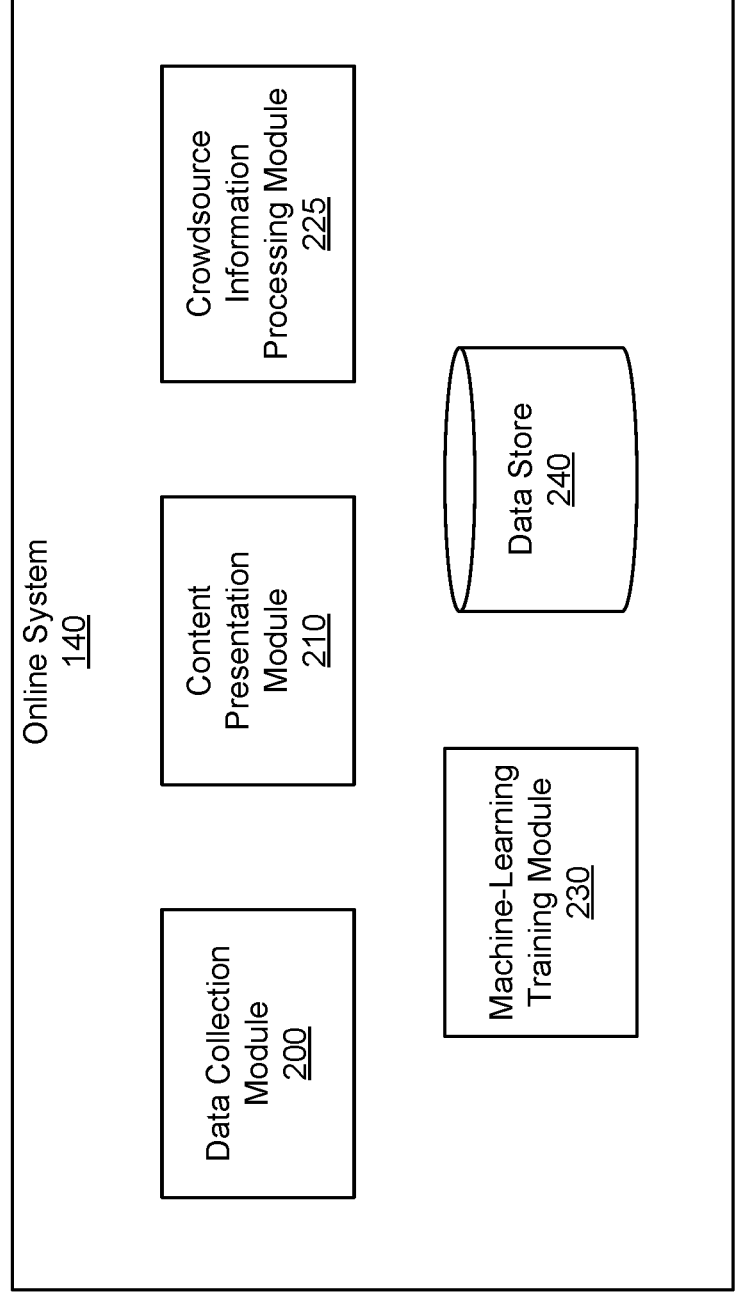
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, a crowd-sourced information processing module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, preferences, favorite items, or stored payment instruments. The user data also may include default settings established by the user, such as a default retailer/retailer location, delivery location, or delivery timeframe. The data collection module 200 may collect the user data from sensors on the client device 100 or based on the user's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a user looked for the item but could not find it), the rate at which the item is found, or the popularity of the item. The data collection module 200 may collect item data from the client devices 100, 110.

An item category is a set of items that are a similar type of item. Items in an item category may be considered equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, when the order was delivered, or a rating that the user gave the delivery of the order. In some embodiments, the order data includes user data for users associated with the order, such as user data for a user who placed the order.

The content presentation module 210 selects content for presentation to a user. For example, the content presentation module 210 selects which items to present to a user while the user is placing an order. The content presentation module 210 generates and transmits the ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a user based on whether the predicted availability of the item exceeds a threshold.

The crowd-sourced information processing module 225 receives and processes crowd-sourced information. The crowd-sourced information processing module 225 may receive comments from users, for example, feedback provided by users related to various entities including products, services, retail stores, and so on. The crowd-sourced information may be represented as unstructured data such as text snippets comprising one or more sentences or phrases. The crowd-sourced information processing module 225 may perform processing of the received text snippets, for example, clustering the text snippets into categories.

In one or more embodiments, the online system 140 may additionally fine-tune parameters of the machine learning based language model using multiple instances of training data. An instance in the training data may include strings or sentences obtained by concatenating inputs and expected outputs of the machine learning based language model. For example, the training data may comprise natural language questions received from users with lists of items, item types, or categories of items associated with the natural language question. The training data may comprise natural language questions concatenated with contextual data describing users further concatenated with lists of items, item types, or categories of items associated with the natural language question. Contextual data describing users includes user profile information of the user, one or more previous interactions of the user with the online system, items previously selected by the user using the online system, browsing history of the user while interacting with the online system, and so on. The machine learning based language model receives an input sentence with missing tokens from the output portion of the input sentence and predicts the missing tokens. A loss function is computed by aggregating loss values obtained from the predicted tokens and the known tokens of the output portion of the sentences provided as training data. The errors obtained from the loss function are backpropagated to update parameters of the machine-learned model.

According to one or more embodiments, training data is generated from historical data. For example, items or item types associated with specific holidays or festivals are obtained by analyzing the items with high frequency of occurrence in transactions performed within a threshold time/days of the specific holidays or festivals. The training data may also be obtained from experts or by crowdsourcing. For example, users may specify the types of items or item types relevant to occasions such as birthdays, weddings, baby showers, housewarming, and so on.

The machine learning training module 230 trains machine learning models used by the online system 140. For example, the machine learning training module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

According to one or more embodiments, the online system 140 provides the crowd-sourced information, for example, user comments to the interface system 160. The interface system 160 builds a structured index using this data, for example, another machine learning based language model or heuristics. The structured index comprises data structures that store information obtained from external sources, for example, a corpus of unstructured text representing the associations described herein. Examples of such indexes include GPT Index and LlamaIndex. The index allows the system to connect the corpus of information with a machine learning based language model so that the answers to a prompt are based on the knowledge of the trained machine learning based language model as well as the information stored in the corpus. Accordingly, in the system as disclosed the answers to prompts requesting attributes or items/item types associated with a search query are based on knowledge of the trained machine learning based language model as well as the information stored in the corpus or user comments.

The data store 240 stores data used by the online system 140. For example, the data store 240 stores user data, item data, and order data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

FIG. 3 is a flowchart for answering shopping related queries based on crowd-sourced information describing retailers collected from multiple users, in accordance with one or more embodiments. Alternative embodiments may include more, fewer, or different steps from those illustrated in FIG. 3, and the steps may be performed in a different order from that illustrated in FIG. 3. These steps may be performed by a system (e.g., online system 140). Additionally, each of these steps may be performed automatically by the online system without human intervention.

The system receives 300 crowd-sourced information describing retailers from various users. The crowd-sourced information may comprise statements received from users, for example, free text representing natural language sentences and phrases. The system provides 310 the input representing the crowd-sourced information describing retailers to a bot. The bot may represent a machine learning based language model, for example, a lightweight language model.

The system generates 320 an aggregate representation of the crowd-sourced information. According to one or more embodiments, the aggregate representation of the crowd-sourced information represents a summary text representation of the sentences received from the user. The system may use a machine learning based language model, for example, a large language model to summarize the crowd-sourced information. According to one or more embodiments, the system may generate different summaries for different retailers. The system may generate different summaries for groups of retailers for example, groups of retailers based on geographic regions, or groups of retailers based on a type of business (e.g., retailers that provide groceries, retailers that provide clothes, and so on). The system may use the light language model to parse the sentences received from users to identify key phrases from the sentences that are provided to a large language model for summarization. The system may store the summary information or provide it for display via client devices.

The system receives 330 a query from a user specifying a set of items that the user is interested in shopping. The query may specify one or more retailers from where the user wants to shop. The system invokes 340 a machine learning based language model (e.g., a large language model) by generating a prompt based on the query from the user and the crowd-sourced information. For example, the system may generate an aggregate representation (e.g., a summary of crowd-sourced information) specific to the one or more retailers that the user is interested in and incorporate the aggregate representation in the prompt. The system receives 350 a response from the machine learning based language model (e.g., a large language model) and provides the response to the user.

Figure 4:
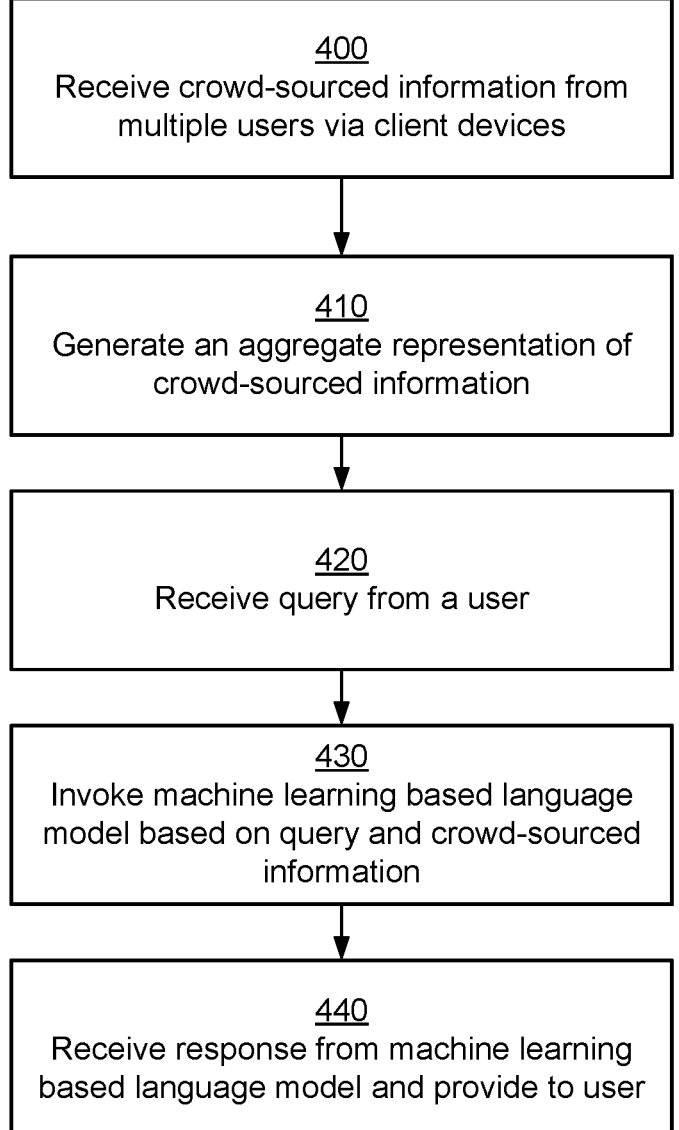
FIG. 4 is a flowchart for answering queries based on crowd-sourced information, in accordance with one or more embodiments.

FIG. 4 is a flowchart for answering queries based on crowd-sourced information, in accordance with one or more embodiments. Alternative embodiments may include more, fewer, or different steps from those illustrated in FIG. 4, and the steps may be performed in a different order from that illustrated in FIG. 4. These steps may be performed by a system (e.g., online system 140). Additionally, each of these steps may be performed automatically by the online system without human intervention. The process described herein can be used for various applications.

The system receives 400 crowd-sourced information from multiple users via client devices. The system generates 410 an aggregate representation of the crowd-sourced information. The system may generate different aggregate representation by classifying the information based on various topics. The system receives 420 a query from a client device.

The system generates a prompt for a machine learning based language model based on the query and the aggregate representation of the crowd-sourced information. According to one or more embodiments, the system may extract an aggregate representation of the crowd-sourced information relevant to the query. The system provides the prompt to the machine learning based language model and invokes 430 the machine learning based language model. The system receives 440 a response generated by executing the machine learning based language model on the prompt and provides the response to the client device.

The process illustrated in FIG. 4 may be used for shopping, for example, as illustrated by the process shown in FIG. 3 or for other applications where crowd-sourced information is useful. The system may collect crowd-sourced information of any group of people that interact with each other for a specific topic and use it for guiding future user requests. For example, a group of users may belong to a book club and provide information about various book that is assimilated by the system. The collective knowledge of the users is used to guide subsequent requests from users who have not read these books. Other groups of users may belong to different types of clubs, for example, group of parents that share information related to parenting, group of hikers that want to share information associated with various hiking trails, group of people interested in fitness that want to share fitness related information, group of travelers that want to share travel related information, and so on. Conventional ways of sharing information through word of mouth and via one or one communication channels (e.g., messages) result in loss of information and also make it difficult to search for information since a user may have to continuously track the communications and mine for information relevant to the user. The system as disclosed provides a natural and easy to use interface to users to provide crowd-sourced information as well as search for the information in a user friendly and efficient manner.

According to one or more embodiments, the system obtains crowd-sourced information from any group of users and classifies (i.e., categorizes) the information based on a set of categories relevant to the group of users. Each instance of crowd-sourced information may represent unstructured text, for example, a snippet of text comprising one or more sentences or phrases input by a user. An example of crowd-sourced information is comments received from users or messages sent by a user. The system may provide each input received from a user (e.g., one or more sentences) to the machine learning based language mode (e.g., LLM) to determine a category for the input. The system stores the input in association with the category. The system may use the LLM to summarize the crowd-sourced information. The system may summarize the entire crowd-sourced information or extract portions of the crowd-sourced information based on certain criteria and generate multiple summaries, for example, a summary for each topic relevant to the crowd-sourced information. For example, the system may categorize the crowd-sourced information into a set of categories and generate a summary for each category. The summarized information may be stored as metadata and used for downstream applications. For example, the summary information may be displayed to users. Alternatively, the summary information may be used for refining queries subsequently received from users.

According to one or more embodiments, the system uses the machine learned language model to categorize the crowd-sourced information into a set of categories. For example, the system may generate an initial set of categories based on a categorization or clustering technique such as k-means clustering that clusters a set of text snippets into a plurality of clusters. The system may provide text snippets belonging to a cluster to the machine learning based language model to generate a summary for that cluster. Accordingly, the system uses the machine learning based language model to generate a summary of each cluster. The system matches each summary with a new input, for example, an input text snippet to identify the best matching summary. The system may generate a prompt comprising a set of summaries describing clusters and the input text snippet and request the machine learning based language model to identify the best matching summary. The system receives the response from the machine learning based language model. The response identifies one of the summaries of the set of summaries specified in the prompt as the summary that is the best match with the input text snippet. The system assigns the new input to the cluster or category corresponding to the best matching summary.

The system may take appropriate action based on the classification of the user input. For example, if the text snippets represent user feedback, for example, complaints or complements provided by users. The system categorizes the user feedback into a plurality of categories, for example, user feedback about customer service, user feedback about specific types of products, user feedback about cleanliness of a facility, user feedback about parking availability, and so on. If a new user feedback is received, the system categorizes the user feedback to determine the category of the user feedback so that the new user feedback can be appropriately routed to a user, for example, a customer service agent trained to handle the user feedback of that particular type.

According to one or more embodiments, the crowd-sourced information may be grouped by categories such as different stores. Accordingly, the system may group user feedback or comments about each individual store and generate a summary for each store. If a user provides a query requesting information about a store, the system provides the summary generated for that store. The system may group user feedback for specific items such as products or services.

According to one or more embodiments, the system receives user requests for information about an item and retrieves information for that item and provides it to the user. The system may generate information including specific properties of each item that users have found relevant in the past. If the item is a product, the properties may describe attributes of the product. For example, properties of avocados include the color of the avocado, an indication of how ripe the avocado is, a size of the avocado and so on. The properties of another product may be different, for example, the properties of ice cream may be the flavors of ice cream, the size of the container, and the brand of the ice cream.

According to one or more embodiments, the system obtains properties of each item from the response of the machine learning based language model and determines possible values for each property by querying a database, for example, a product catalog. For example, the system may determine various flavors of ice cream by querying the product catalog. According to one or more embodiments, the system determines possible values for a property by generating a new prompt for the machine learning based language model, the new prompt identifying the item and the property and requesting the machine learning based language model to identify possible values of the property. This may be necessary in case the product catalog does not store the property. For example, a property such as the color of avocados may be determined from user comments but may not be explicitly listed in the product catalog. The user comments may identify a property if users leave feedback mentioning specific properties of items such as specific colors of avocados even though the property is not explicitly stored in a database such as the product catalog. The system may enhance the database such as product catalog by adding properties of specific items determined from user comments by executing the machine learning based model. The system may add metadata describing the additional properties of an item and corresponding values of the property such that the property can be listed in a user interface for the user.

The system generates a user interface that displays a set of items and one or more properties of each item. The user interface may display a different set of properties for each item. For each property, the user interface may display one or more values of the properties. The user interface allows the user to select values of each property. The system may use a default value for a property if the user does not select a specific value. For example, for avocados, the properties may be (1) color of avocados with possible values, green and dark, (2) size of avocados with possible values, small, medium, and large. The disclosed techniques improve the user interactions and the user interface for the user by providing specific information for users to select for each item.

Figure 5:
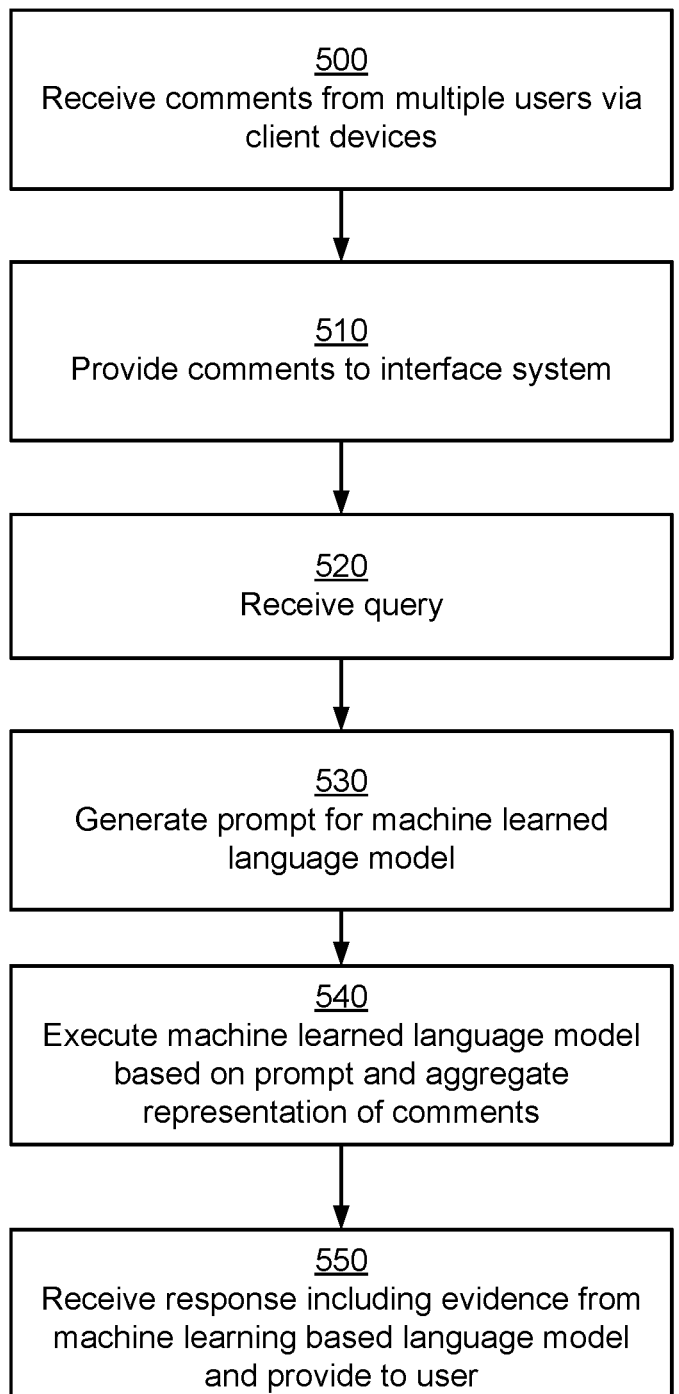
FIG. 5 is a flowchart for answering queries based on comments from users, in accordance with one or more embodiments.

FIG. 5 is a flowchart for answering queries based on comments from users, in accordance with one or more embodiments. Alternative embodiments may include more, fewer, or different steps from those illustrated in FIG. 5, and the steps may be performed in a different order from that illustrated in FIG. 5. These steps may be performed by a system (e.g., online system 140). Additionally, each of these steps may be performed automatically by the online system without human intervention.

The system receives 500 comments from users, for example, free text representing natural language sentences and phrases. The system provides 510 the input representing the comments to the interface system 160.

The system receives 520 a query. The query may be a request for information representing an insight obtained from the user comments. An insight may also be referred to herein as a user insight or customer insight. The system generates 530 a prompt based on the query from the user. The system invokes 540 the machine learned language model (e.g., a large language model). The system receives 550 a response from the machine learning based language model (e.g., a large language model) and provides it to the user. The response includes a natural language description of the insight as well as evidence for the insight.

According to one or more embodiments, the query may request information describing why users are taking a specific action. For example, the query may request information describing characteristics of a product that users consider when purchasing the product. For example, the product may be a fruit or vegetable and the characteristics of the product may be a texture, color, size, and so on. Users may be interested in different characteristics of different products.

Figure 6:
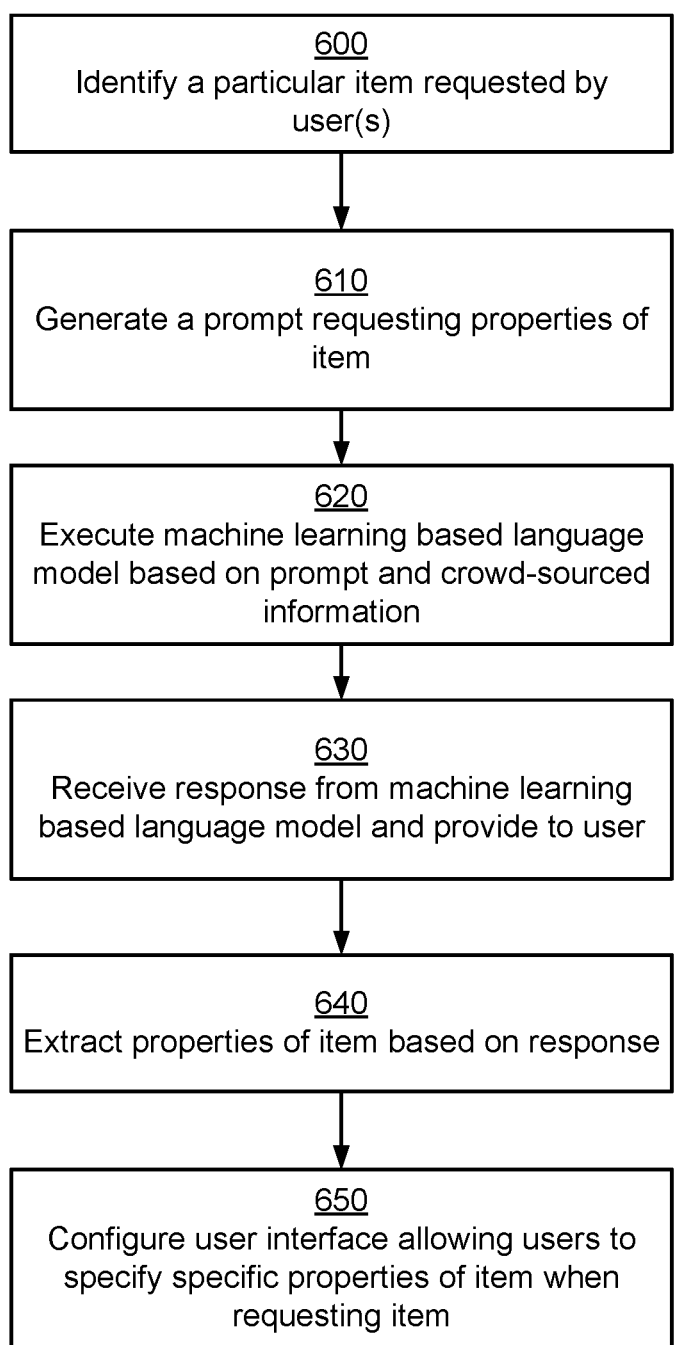
FIG. 6 is a flowchart for improving user interactions associated with items such as products or services, in accordance with one or more embodiments.

FIG. 6 is a flowchart for improving user interactions associated with items such as products or services, in accordance with one or more embodiments. Alternative embodiments may include more, fewer, or different steps from those illustrated in FIG. 6, and the steps may be performed in a different order from that illustrated in FIG. 6. These steps may be performed by a system (e.g., online system 140). Additionally, each of these steps may be performed automatically by the online system without human intervention. The process described herein can be used for various applications.

The system identifies 600 a particular item that is requested by users. The item may be identified from a purchase order comprising multiple items received from a user. The item may represent a product that is frequently purchased by multiple users.

The system generates 610 a prompt for a machine learning based language model. The prompt requests properties of the item that users are typically interested in. The prompt may also request evidence for the properties that the machine learning based language model identifies. The system provides the prompt to the machine learning based language model and executes 620 the machine learning based language model. The system receives 630 a response generated by executing the machine learning based language model on the prompt and provides the response to the client device. The system extracts 640 a list of properties of the item from the response. The system configures 650 a user interface that allows users to make selections of specific properties in items that the user is interested in purchasing. For example, the system may determine that users typically consider properties P1, P2, P3, P4 while purchasing the product. The system may generate a user interface that lists the properties and allows users to select a subset of the properties. For example, a user may specify that the user is interested in purchasing an item that has specific properties P2, P4.

Some of the properties may be provided as alternatives using a widget such as a radio button or a drop-down list that allows users to select one out of a plurality of options. For example, if the item is a fruit and the property is a color of the fruit, the user interface may provide a radio button that allows users to select a specific color from a plurality of colors that the fruit typically has.

According to one or more embodiments, the system receives user feedback on the properties provided to the user. For example, a user may mark one or more properties as irrelevant. Alternatively, the user selection of a property is treated as positive feedback indicating that the machine learning model predicted the property accurately. The system may adjust the prompt generated or weights of the machine learning based language model based on the user feedback. For example, the system may modify the prompt to improve the result quality by increasing the likelihood of generating properties with positive feedback and/or decreasing the likelihood of generating properties with negative feedback. For example, the system may modify the prompt and re-execute some of the queries obtained previously to see which modifications improve the result quality. The system retains the prompt modifications that improve the result quality and rejects the prompt modifications that decrease the result quality.

Additional Considerations

The foregoing description of the embodiments has been presented for the purpose of illustration; many modifications and variations are possible while remaining within the principles and teachings of the above description. The foregoing description of the embodiments has been presented for the purpose of illustration; many modifications and variations are possible while remaining within the principles and teachings of the above description. Embodiments comprise computer-implemented methods comprising steps of processes described herein. Embodiments comprise non-transitory computer readable storage medium storing instructions that when executed by one or more computer processors cause the one or more computer processors to perform steps of methods disclosed herein. Embodiments comprise computer system comprising one or more computer processors and a non-transitory computer readable storage medium storing instructions that when executed by one or more computer processors cause the one or more computer processors to perform steps of method disclosed herein.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
at a computer system comprising a processor and a computer-readable medium:
receiving a plurality of comments from users;
providing the plurality of comments to an index associated with a machine learning based large language model;
receiving, from a client device, a request;
querying the index based on the received request to retrieve context data relevant to the received request;
generating a prompt for input to the machine learning based large language model based on the received request from the client device and the context data retrieved from the index;
providing the prompt to the machine learning based large language model for execution;
receiving a response generated by the machine learning based large language model based on the prompt; and
providing request response information to the client device based on the response received from the machine learning based large language model.

2. The method of claim 1, wherein the query requests an insight on a particular topic, wherein the response generated by the machine learning based language model comprises the insight on the particular topic and evidence for the insight, the evidence identifying one or more comments used to obtain the insight.

3. The method of claim 2, wherein the query concerns an item, wherein the prompt requests the machine learning based language model to generate insight, wherein the insight identifies one or more properties of the item.

4. The method of claim 3, further comprising, identifying a set of possible values for each of the one or more properties, wherein the set of possible values for a particular property is determined based on one or more of:
accessing a database for identifying the set of possible values for the particular property; or
generating a new prompt for the machine learning based language model, the prompt identifying a particular item and a particular property and requesting the machine learning based language model to list properties of the item.

5. The method of claim 4, wherein the response identifies one or more properties of the item, the method further comprising:
configuring a user interface to display the one or more properties of the item, the user interface configured to display a set of values for each of the one or more properties and allowing users to select one or more values for each of the one or more properties; and
sending the user interface for display.

6. The method of claim 1, further comprising:
generating one or more aggregate representations based on the plurality of comments, wherein the response is based on the one or more aggregate representations based on the plurality of comments.

7. The method of claim 6, wherein the prompt for input to the machine learning based language model is based on the query and an aggregate representation of the plurality of comments.

8. The method of claim 6, further comprising:
categorizing the plurality of comments into a plurality of categories, each category associated with a summary representing an aggregate representation of comments assigned to the category.

9. The method of claim 8, wherein the query represents a comment from a user, wherein the response determines a category associated with the query, the method further comprising:
routing the comment to a particular user based on the category associated with the query.

10. A non-transitory computer readable storage medium storing instructions that when executed by one or more computer processors cause the one or more computer processors to perform steps comprising:
receiving a plurality of comments from users;
providing the plurality of comments to an index associated with a machine learning based large language model;
receiving, from a client device, a request;
querying the index based on the received request to retrieve context data relevant to the received request;
generating a prompt for input to the machine learning based large language model based on the received request from the client device and the context data retrieved from the index;
providing the prompt to the machine learning based large language model for execution;
receiving a response generated by the machine learning based large language model based on the prompt; and
providing request response information to the client device based on the response received from the machine learning based large language model.

11. The non-transitory computer readable storage medium of claim 10, wherein the query requests an insight on a particular topic, wherein the response generated by the machine learning based language model comprises the insight on the particular topic and evidence for the insight, the evidence identifying one or more comments used to obtain the insight.

12. The non-transitory computer readable storage medium of claim 11, wherein the query concerns an item, wherein the prompt requests the machine learning based language model to generate insight, wherein the insight identifies one or more properties of the item further comprising,
identifying a set of possible values for each of the one or more properties by performing one or more of:
accessing a database for identifying the set of possible values for a particular property; or
generating a new prompt for the machine learning based language model, the prompt identifying a particular item and a particular property and requesting the machine learning based language model to list properties of the item.

13. The non-transitory computer readable storage medium of claim 12, wherein the response identifies one or more properties of the item, the instructions further causing the one or more computer processors to perform steps comprising:

configuring a user interface to display the one or more properties of the item, the user interface configured to display a set of values for each of the one or more properties and allowing users to select one or more values for each of the one or more properties; and sending the user interface for display.

14. The non-transitory computer readable storage medium of claim 10, the instructions further causing the one or more computer processors to perform steps comprising:

generating one or more aggregate representations based on the plurality of comments, wherein the response is based on the one or more aggregate representations based on the plurality of comments.

15. The non-transitory computer readable storage medium of claim 14, the instructions further causing the one or more computer processors to perform steps comprising:

categorizing the plurality of comments into a plurality of categories, each category associated with a summary representing an aggregate representation of comments assigned to the category.

16. The non-transitory computer readable storage medium of claim 15, wherein the query represents a comment from a user, wherein the response determines a category associated with the query, the instructions further causing the one or more computer processors to perform steps comprising:

routing the comment to a particular user based on the category associated with the query.

17. A computer system comprising:

one or more computer processors; and a non-transitory computer readable storage medium storing instructions that when executed by one or more computer processors cause the one or more computer processors to perform steps comprising:

receiving a plurality of comments from users;

providing the plurality of comments to an index associated with a machine learning based large language model;

receiving, from a client device, a request;

querying the index based on the received request to retrieve context data relevant to the received request;

generating a prompt for input to the machine learning based large language model based on the received request from the client device and the context data retrieved from the index;

providing the prompt to the machine learning based large language model for execution;

receiving a response generated by the machine learning based large language model based on the prompt; and providing request response information to the client device based on the response received from the machine learning based large language model.

18. The computer system of claim 17, wherein the query requests an insight on a particular topic, wherein the response generated by the machine learning based language model comprises the insight on the particular topic and evidence for the insight, the evidence identifying one or more comments used to obtain the insight.

19. The computer system of claim 17, wherein the query concerns an item, wherein the prompt requests the machine learning based language model to generate insight, wherein the insight identifies one or more properties of the item further comprising, identifying a set of possible values for each of the one or more properties by performing one or more of:

accessing a database for identifying the set of possible values for a particular property; or generating a new prompt for the machine learning based language model, the prompt identifying a particular item and a particular property and requesting the machine learning based language model to list properties of the item.

20. The computer system of claim 17, wherein the response identifies one or more properties of an item, the instructions further causing the one or more computer processors to perform steps comprising:

configuring a user interface to display the one or more properties of the item, the user interface configured to display a set of values for each of the one or more properties and allowing users to select one or more values for each of the one or more properties; and sending the user interface for display.

* * * * *